(12) United States Patent
Liang et al.

(10) Patent No.: US 8,405,327 B2
(45) Date of Patent: Mar. 26, 2013

(54) PASSIVE CONVERTER FOR DRIVE DEVICE OF SWITCHED RELUCTANCE MOTOR

(75) Inventors: Jianing Liang, Busan (KR); Dong Hee Lee, Busan (KR); Jin Woo Ahn, Busan (KR)

(73) Assignee: Easy Life Center Co., Ltd., Busan (KR)

( * ) Notice: Subject to any disclaimer, the term of this patent is extended or adjusted under 35 U.S.C. 154(b) by 411 days.

(21) Appl. No.: 12/761,552

(22) Filed: Apr. 16, 2010

(65) Prior Publication Data
US 2010/0264858 A1    Oct. 21, 2010

(30) Foreign Application Priority Data

Apr. 17, 2009  (KR) .................. 10-2009-0033832

(51) Int. Cl.
*H02P 25/08*    (2006.01)
*H02M 5/40*    (2006.01)

(52) U.S. Cl. ......... 318/254.1; 363/35; 363/39; 307/151; 318/701

(58) Field of Classification Search ............... 318/254.1, 318/254.2, 701; 363/35, 39, 46, 65, 89, 90, 363/126; 323/222–225, 232; 307/11, 38, 307/39, 82, 91, 110, 151

See application file for complete search history.

(56) References Cited

U.S. PATENT DOCUMENTS

| | | | | |
|---|---|---|---|---|
| 5,771,166 A * | 6/1998 | Lim | ............................... | 363/132 |
| 5,847,949 A * | 12/1998 | Jiang | ............................... | 363/65 |
| 6,051,942 A * | 4/2000 | French | ........................ | 318/254.1 |
| 6,342,772 B1 * | 1/2002 | Gallegos-Lopez et al. | ... | 318/701 |
| 7,274,579 B2 * | 9/2007 | Ueda et al. | ..................... | 363/125 |
| 7,372,232 B2 * | 5/2008 | Ramu | ......................... | 318/700 |
| 7,443,125 B2 * | 10/2008 | Clothier et al. | ............... | 318/701 |
| 2002/0158606 A1 * | 10/2002 | King | ............................... | 320/125 |
| 2004/0189226 A1 * | 9/2004 | King | ............................... | 318/375 |
| 2006/0132081 A1 * | 6/2006 | Clothier et al. | ............... | 318/701 |
| 2007/0075671 A1 * | 4/2007 | Ahn et al. | ...................... | 318/701 |
| 2007/0273322 A1 * | 11/2007 | Ramu | ........................... | 318/701 |
| 2008/0315896 A1 * | 12/2008 | Fahimi et al. | ................ | 324/603 |
| 2009/0201620 A1 * | 8/2009 | Gray et al. | ..................... | 361/159 |
| 2011/0069515 A1 * | 3/2011 | Liang et al. | ................... | 363/126 |

* cited by examiner

*Primary Examiner* — Eduardo Colon Santana
(74) *Attorney, Agent, or Firm* — Kile Park Reed & Houtteman PLLC

(57) ABSTRACT

Disclosed is a passive converter for a drive device of a switched reluctance motor (SRM), in which high demagnetization voltage for the SRM is provided. The converter includes a rectifier which smoothes input voltage to supply DC voltage, a boost circuit connected with the rectifier, and an asymmetric converter connected with the boost circuit, and the boost circuit includes first to third diodes and first and second capacitors. The high demagnetization voltage is generated at current duration of a single phase or poly-phase SRM by using the passive converter for the drive device of the SRM, so that the driving efficiency and the output power of the SRM can be increased.

4 Claims, 18 Drawing Sheets

Prior Art

Prior Art

Prior Art

Prior Art

PASSIVE CONVERTER FOR DRIVE DEVICE OF SWITCHED RELUCTANCE MOTOR

BACKGROUND OF THE INVENTION

1. Field of the Invention

The present invention relates to a switched reluctance motor (SRM) drive device to drive an SRM. More particularly, the present invention relates to a passive converter for an SRM drive device capable of controlling a 3-phase SRM of the passive converter.

2. Description of the Related Art

In general, a switched reluctance motor (SRM) requires a switching controller, and both of a stator and a rotor of the SRM have a salient pole structure. Particularly, since a winding is wound around only the stator, but the rotor has no winding or a permanent magnet, the SRM has a simple structure. Due to the structural characteristic of the SRM, the SRM has remarkable advantages when the SRM is manufactured. In addition, while the SRM generates great torque with superior driving performance like a DC motor, it is unnecessary to frequently perform the maintenance of the SRM. Since the SRM has superior characteristics in an amount of torque per unit volume, efficiency, the rate of a converter, and so forth, the application fields of the SRM are gradually increased.

FIG. 1 is a block diagram schematically showing a single-phase SRM drive device according to the related art.

Referring to FIG. 1, the single-phase SRM drive device includes a rectifier and smoothing circuit 102, a motor driver 103, and a position sensor 105. The rectifier and smoothing circuit 102 rectifies and smoothes AC voltage, which is applied from a supply voltage 101 (or AC supply voltage), into DC voltage. The motor driver 103 receives the DC voltage from the rectifier and smoothing circuit 102 and a control signal from a micro-processor 106 to drive a motor 104. The position sensor 105 detects the position and the speed of the motor 104 to output a detection signal to the micro-processor 105.

The rectifier and smoothing circuit 102 rectifies and smoothes AC voltage input from the supply voltage 101. The rectified and smoothed voltage is supplied to the motor driver 103, and the motor driver 103 supplies the voltage to the motor 104 according to the control signal from the micro-processor 106. The micro-processor 106 receives the detection signal generated from the position sensor 105 of detecting the rotational speed and the phase of the motor 104 to control the motor driver 103, and controls the voltage supplied from the motor driver 103 to the motor 104.

FIG. 2 is a circuit diagram showing one example of the motor driver 103 of the single-phase SRM drive device.

The motor driver 103 of the single-phase SRM drive device includes a DC link capacitor 201, upper and lower switching elements 202 and 203, a motor winding 206, a first diode 204, and a second diode 205. The DC link capacitor 201 supplies DC voltage into which input AC voltage is rectified and smoothed. The upper and lower switching elements 202 and 203 are connected with the DC link capacitor 201 in parallel. The upper and lower switching elements 202 and 203 are connected with each other in series and are turned on/off according to a driving signal output from a switch driver to output a gate driving signal used to forwardly or reversely rotate the motor 104 according to a position signal of a rotor of an SRM 207. The motor winding 206 generates torque according to the on/off operation of the upper and lower switching elements 202 and 203. The first diode 204 is connected between one terminal of the upper switching element 202 and one terminal of the lower switching element 203. The second diode 205 is connected between opposite ends of the upper and lower switching elements 202 and 203.

Accordingly, the upper and lower switching elements 202 and 203 are turned on during a predetermined period of time according to the positions of the stator and the rotor of the SRM 207, so that a current path of the DC link capacitor 201, the upper switching element 202, the motor winding 206, and the lower switching element 203 is formed, thereby applying the DC voltage, which is obtained through smoothing, to the motor winding 206. Therefore, magnetic force is generated from the stator of the SRM 207 to attract the rotor, so that the SRM 207 is rotated. If both of the upper and lower switching elements 202 and 203 are turned off when the SRM 20 rotates, phase current, which has been applied to the motor winding 206, flows to the supply voltage 101 through the first diode 204, the motor winding 206, the second diode 205, and the DC link capacitor 201.

As described above, the SRM drives the motor 104 by supplying or cutting off voltage to the motor 104 according to an on/off state of the upper and lower switching elements 202 and 203 constituting the motor driver 103. Regarding control signals applied to the upper and lower switching elements 202 and 203, as shown in FIG. 1, if the position sensor 105 detects the phase of the motor 104 to provide a detection signal to the micro-processor 106, the micro-processor 106 performs PWM (pulse width modulation) using the detection signal from the position sensor 105, such that the control signals control the on/off operation of the upper or lower switching element 202 or 203 according to a duty ratio of the PWM.

FIG. 3 is a circuit diagram showing another example of the motor driver 103 of the single-phase SRM drive device.

The motor driver 103 shown in FIG. 3 includes a pair of DC link capacitors 301 and 302, a motor winding 305, a first diode 306, and a second diode 307. The DC link capacitors 301 and 302 supply DC voltage obtained by smoothing input AC voltage. The upper and lower switching elements 303 and 304 are connected with the paired DC link capacitors 301 and 303 in parallel. The upper and lower switching elements 303 and 304 are connected with each other in series and are turned on/off according to a driving signal output from a switch driver to output a gate driving signal used to forwardly or reversely rotate the motor 104 according to a position signal of a rotor of the SRM. The motor winding 305 generates torque according to an on/off operation of the upper and lower switching elements 303 and 304. The first diode 306 is connected between one end of the upper switching element 303 and one end of the lower switching element 304. The second diode 307 is connected between opposite ends of the upper and second switching elements 303 and 304.

Hereinafter, the operating procedure of the motor driver 104 of the single-phase SRM drive device having the above structure will be described.

When supply voltage (AC voltage) of 220V is applied to the motor driver 104 from an external voltage source, the DC voltage of the paired DC link capacitors 301 and 302 approximates about 310V. If the upper and lower switching elements 303 and 304 are turned on, excitation voltage is applied the motor winding 305, so that phase current of the motor winding 305 is gradually increased. Thereafter, if the upper and lower switching elements 303 and 304 are turned off, the phase current of the motor winding 305 is decreased due to demagnetization voltage having a magnitude identical to DC 310V of the excitation voltage.

In the conventional SRM drive device, since excitation voltage to apply current to the motor winding 305 is identical to demagnetization voltage to remove the excitation voltage, it takes too much time (t) to remove the current from the motor winding 305. If the phase current stays in the motor winding 305 for a long time, a stator attracts a rotor, called countertorque, so that problems may occur in the SRM operating at a high speed.

In the motor driver 103 of the SRM drive device, since excitation voltage and demagnetization voltage are limited to DC link voltage, phase current required at high-speed operation is difficult to build up, so that negative torque is generated and output power is reduced due to tail current.

In order to solve the problems, various boost converts have been suggested.

For example, the DC link voltage may be increased by employing a boost converter and a buck-boost converter, thereby improving the utilization of torque and increasing the output power.

However, the boost converter and the buck-boost converter additionally require an inductor, a diode, a capacitor, and a power switch. Accordingly, the price of the converters is increased, and a complicated boost voltage control method is required.

In addition, series and parallel passive boost converters have been suggested. Although the two passive boost converters have a simple structure, demagnetization current is charged to an additional boost capacitor, so that effective boost voltage higher than DC link voltage is applied. However, since the boost voltage depends on recovered energy, a controllable speed range is restricted.

SUMMARY OF THE INVENTION

Accordingly, the present invention has been made to solve the above-mentioned problems occurring in the prior art, and the present invention provides an SRM drive device having high demagnetization voltage used for an SRM.

In order to accomplish the object of the present invention, there is provided a passive converter for a drive device of a switched reluctance motor, and the passive converter includes a rectifier which smoothes input voltage to supply DC voltage, a boost circuit connected with the rectifier, and an asymmetric converter connected with the boost circuit. The boost circuit includes first to third diodes and first and second capacitors.

In the passive converter for the drive device of the switched reluctance motor according to the present invention, the boost circuit includes first to fourth terminals, and input/output voltage of the first to fourth terminals depends on the first and second capacitors.

In the passive converter for the drive device of the switched reluctance motor according to the present invention, the first capacitor is connected between the first and second terminals, the second capacitor and the third diode are connected between the third and fourth terminals, the first diode is connected between the first and third terminals, and the second diode is connected between the first and second capacitors.

In the passive converter for the drive device of the switched reluctance motor according to the present invention, the first and second capacitors include a passive capacitor.

In the passive converter for the drive device of the switched reluctance motor according to the present invention, the first and second capacitors are connected with each other in parallel when the asymmetric converter operates at an excitation mode, the first and second capacitors operate in series when the asymmetric converter operates at a demagnetization mode, and DC link voltage is applied to a phase winding of the switched reluctance motor at the excitation mode, and double DC link voltage is applied to the phase winding at the demagnetization mode.

As described above, according to the passive converter for the SRM drive device of the present invention, high demagnetization voltage is generated at extinction duration of a poly-phase SRM, so that the driving efficiency and the output power of the SRM can be increased.

DETAILED DESCRIPTION OF THE PREFERRED EMBODIMENTS

The objects, other objects, and novel features of the present invention will be more cleared by the specification of the present invention and accompanying drawings.

The concept of the present invention is as follows.

According to the present invention, a passive capacitor circuit includes three diodes and two capacitors and is located at a front end of an asymmetric converter. Based on the passive capacitor circuit, two capacitors are connected in series or in parallel. A phase winding of a single-phase switched reluctance motor (SRM) receives DC link voltage at an excitation mode, and receives double DC link voltage at a demagnetization mode. In poly-phase driving, double DC link voltage is applied to the phase winding at both of the excitation and demagnetization modes. An operation mode in single-phase and poly-phase driving is analyzed, and the operation of a passive converter according to the present invention is verified through simulation.

Figure 1:
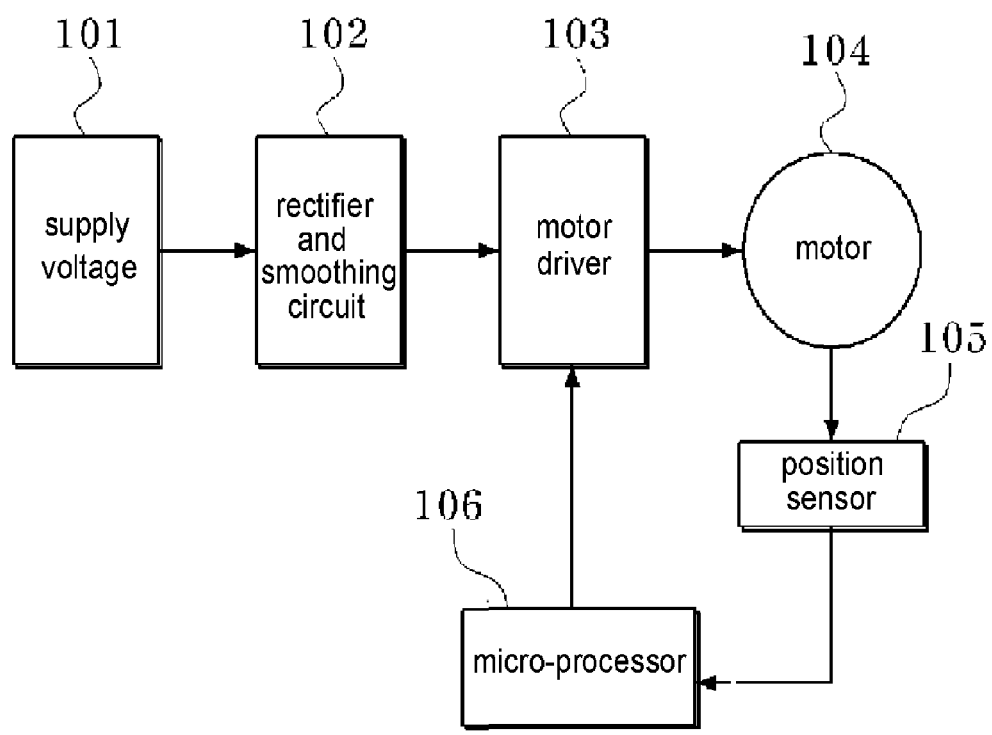
FIG. 1 is a block diagram schematically showing a single-phase switched reluctance motor (SRM) drive device according to the related art.
Figure 2:
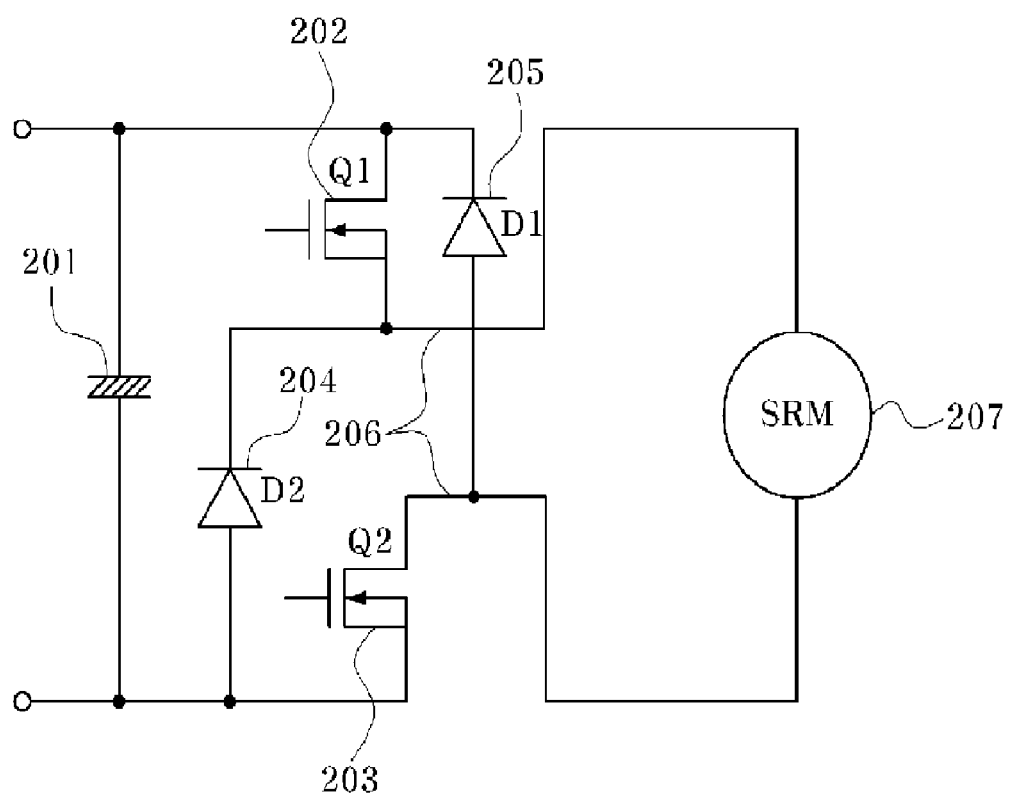
FIG. 2 is a circuit diagram showing one example of a motor driver of the SRM.
Figure 3:
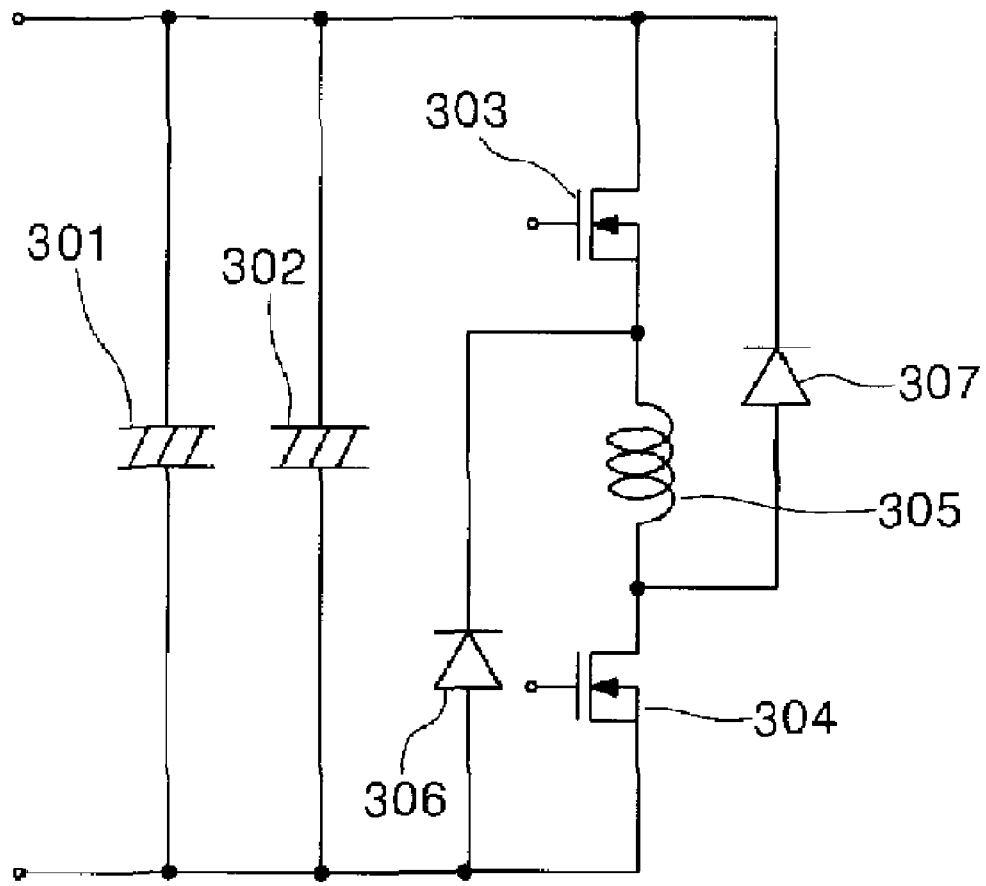
FIG. 3 is a circuit diagram showing another example of a motor driver of the SRM.
Figure 4A:
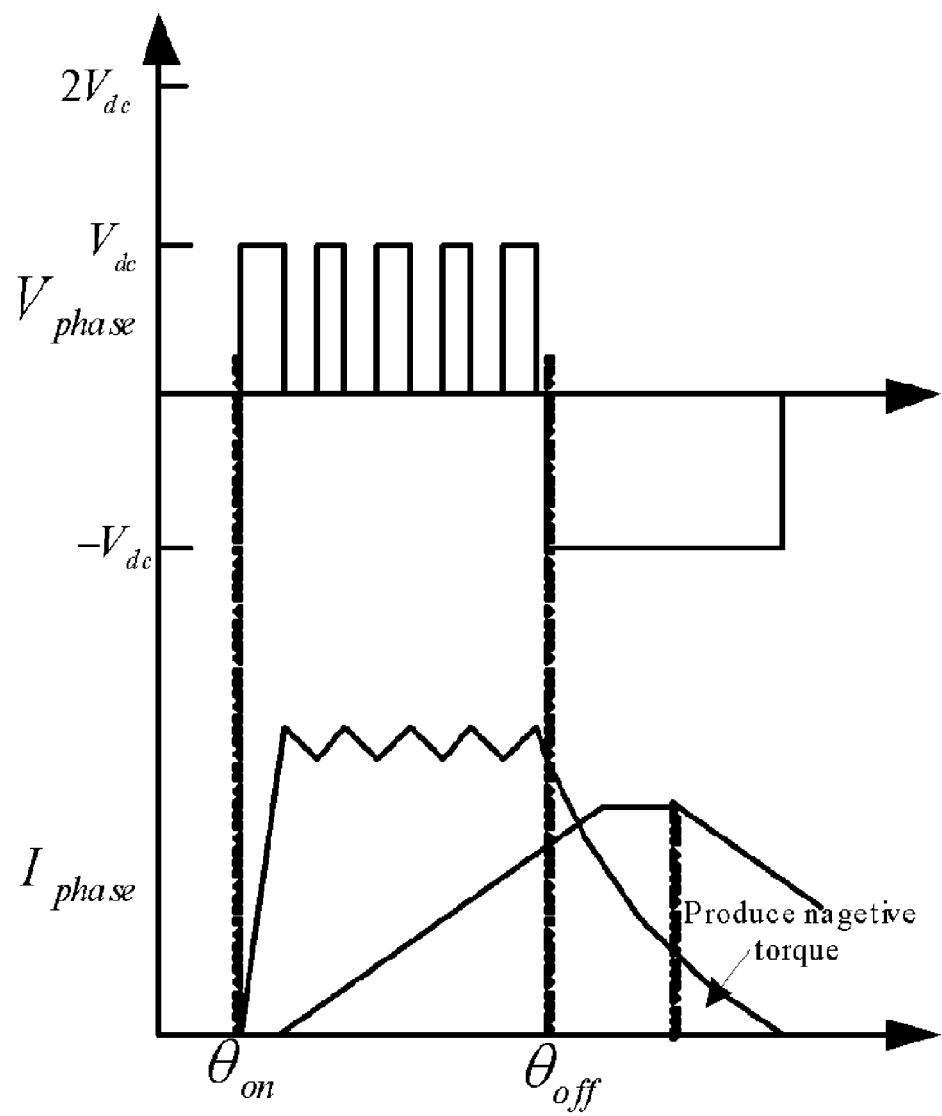
FIGS. 4A and 4B are graphs showing the driving characteristic of the SRM.

An SRM drive device according to the related art includes one diode bridge rectifier and a large capacitor at a front end. The capacitor maintains stabilized DC link voltage, and stores magnetic energy when an SRM is turned off. Therefore, as shown in FIG. 4A, since the magnitude of excitation and demagnetization voltage approximates the voltage of a DC link capacitor, fixed DC link voltage confines the characteristics of the SRM drive device in a high-speed operation.

Figure 4B:
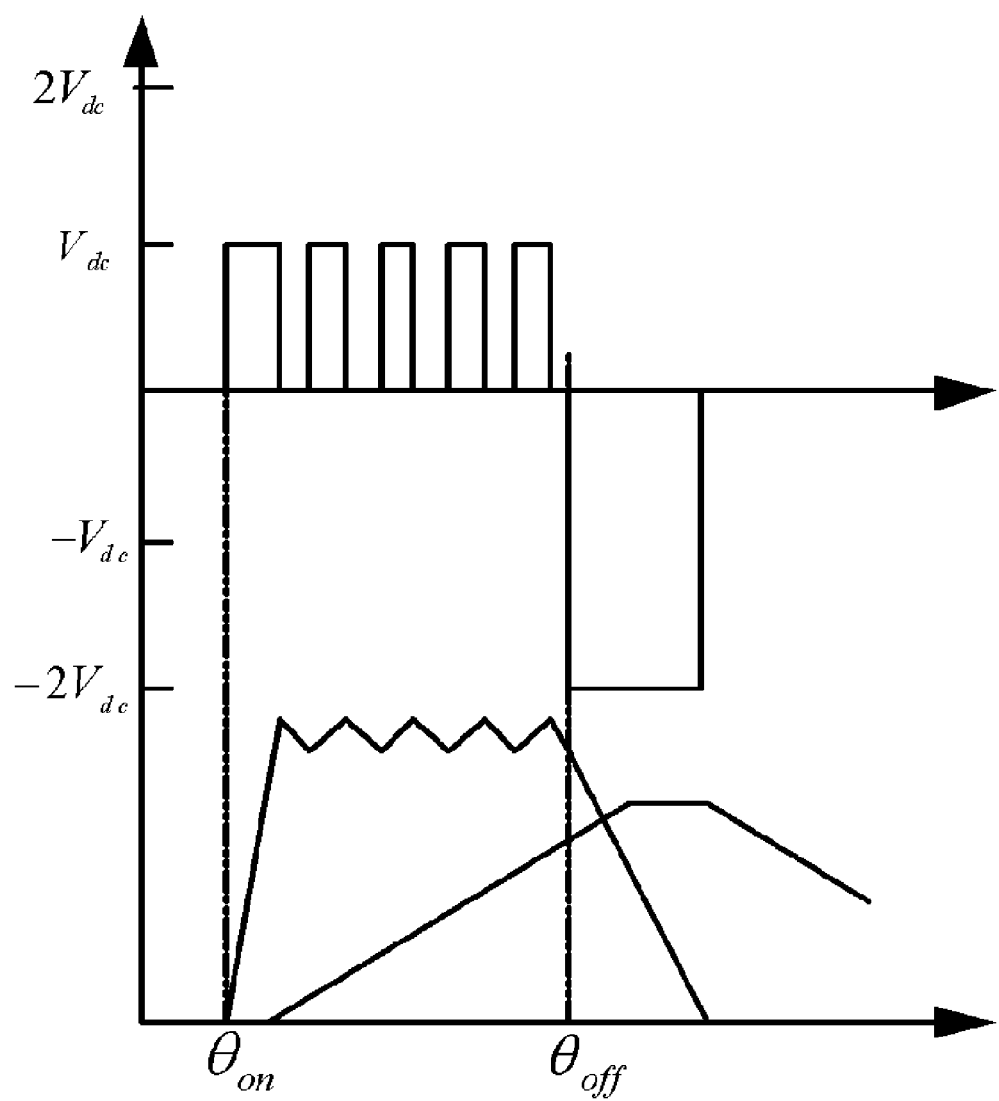

However, if high demagnetization voltage is applied according to the present invention, the driving characteristics of the SRM at a high speed can be improved. In other words, when high demagnetization voltage is applied as shown in FIG. 4B, a dwell angle is expanded and negative torque is reduced, so that average torque and efficiency can be increased.

Hereinafter, the structure of an SRM drive device according to the present invention will be described with reference to accompanying drawings.

Figure 5:
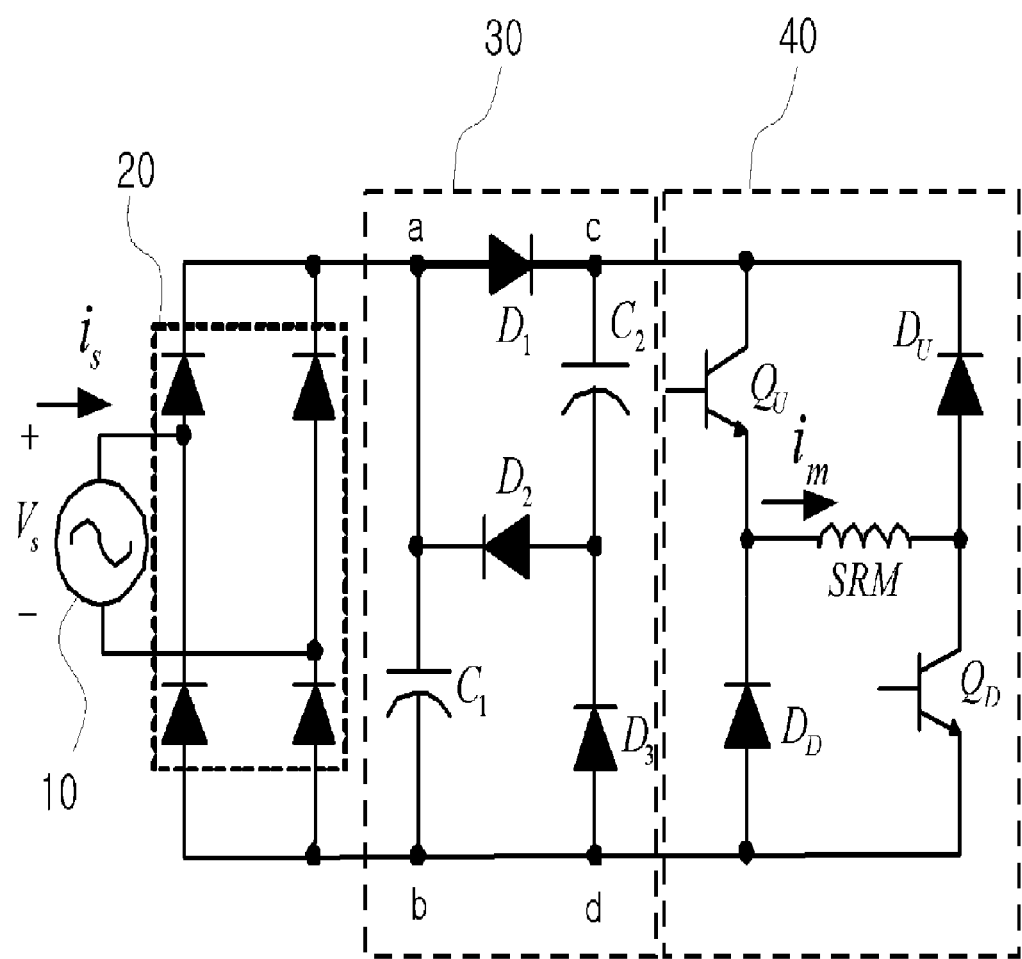
FIG. 5 is a circuit diagram showing the structure of a passive converter for an SRM drive device according to the present invention.

FIG. 5 is a circuit diagram showing the structure of a passive converter for the SRM drive device according to the present invention.

As shown in FIG. 5. the SRM drive device includes a rectifier 20 to supply DC voltage by smoothing input voltage from a voltage source 10, a boost circuit 30 connected to the rectifier 20, and an asymmetric converter 40 connected to the boost circuit 30.

The boost circuit 30 includes first to third diodes $D_1$ to $D_3$, and first and second capacitors $C_1$ and $C_2$. The first and second capacitors $C_1$ and $C_2$ include passive capacitors.

In other words, according to the present invention, a passive capacitor circuit, which is the boost circuit 30, is additionally provided at a front end of the asymmetric converter 40.

The boost circuit 30 includes first to fourth terminals a to d. The first capacitor $C_1$ is connected between the first and second terminals a and b, the second capacitor $C_2$ is connected to the third diode $D_3$ between the third and fourth terminals c and d, the first diode $D_1$ is connected between the first and third terminals a and c, and the second diode $D_2$ is connected between the first and second capacitors $C_1$ and $C_2$. Input or output voltage of the first to fourth terminals a to d depends on the first and second capacitors $C_1$ and $C_2$.

When the asymmetric converter 40 operates at an excitation mode based on the boost circuit 30, that is, when the second diode $D_2$ is turned off, the first and second capacitors $C_1$ and $C_2$ are connected with each other in parallel. When the asymmetric converter 40 operates at a demagnetization mode, that is, when the second diode $D_2$ is turned on, the first and second capacitors $C_1$ and $C_2$ operate in series. Due to the operation, DC link voltage is applied to a phase winding of an SRM at the excitation mode, and double link voltage is applied to the phase winding at the demagnetization mode.

As shown in FIG. 5, since the rectifier 20 and the asymmetric converter 40 have a structure similar to a conventional structure thereof, details thereof will be omitted in order to avoid redundancy.

In a general SRM drive device, voltage is supplied from one DC link capacitor. Accordingly, excitation or demagnetization voltage is identical to the voltage of the DC link capacitor.

However, since the passive converter for the SRM drive device according to the present invention is applicable for a single phase or a poly-phase, the driving efficiency and the output power of the SRM can be increased.

In other words, according to the present invention, in the case of single phase driving, since the passive capacitor circuit, which is the boost circuit 30, supplies different voltage at excitation and demagnetization modes, phase current overlap does not occur. Accordingly, operation modes of the passive converter are classified into a fast demagnetization mode, an excitation mode, and a freewheeling mode.

Meanwhile, in the case of poly-phase driving, the phase current overlap may occur. Excitation voltage of a present phase is identical to demagnetization voltage of a previous phase like the operation of the asymmetric converter 40. However, the DC link voltage and the double DC link voltage are automatically selected and applied to the phase winding for phase current overlap duration.

In order to analyze the driving of the passive converter according to the present invention in a poly-phase SRM, the operation modes are classified into five modes of a boost capacitor excitation mode, a DC link capacitor excitation mode, a two-capacitor excitation mode, a freewheeling mode, and a fast demagnetization mode according to a switch operation state.

Figure 6A:
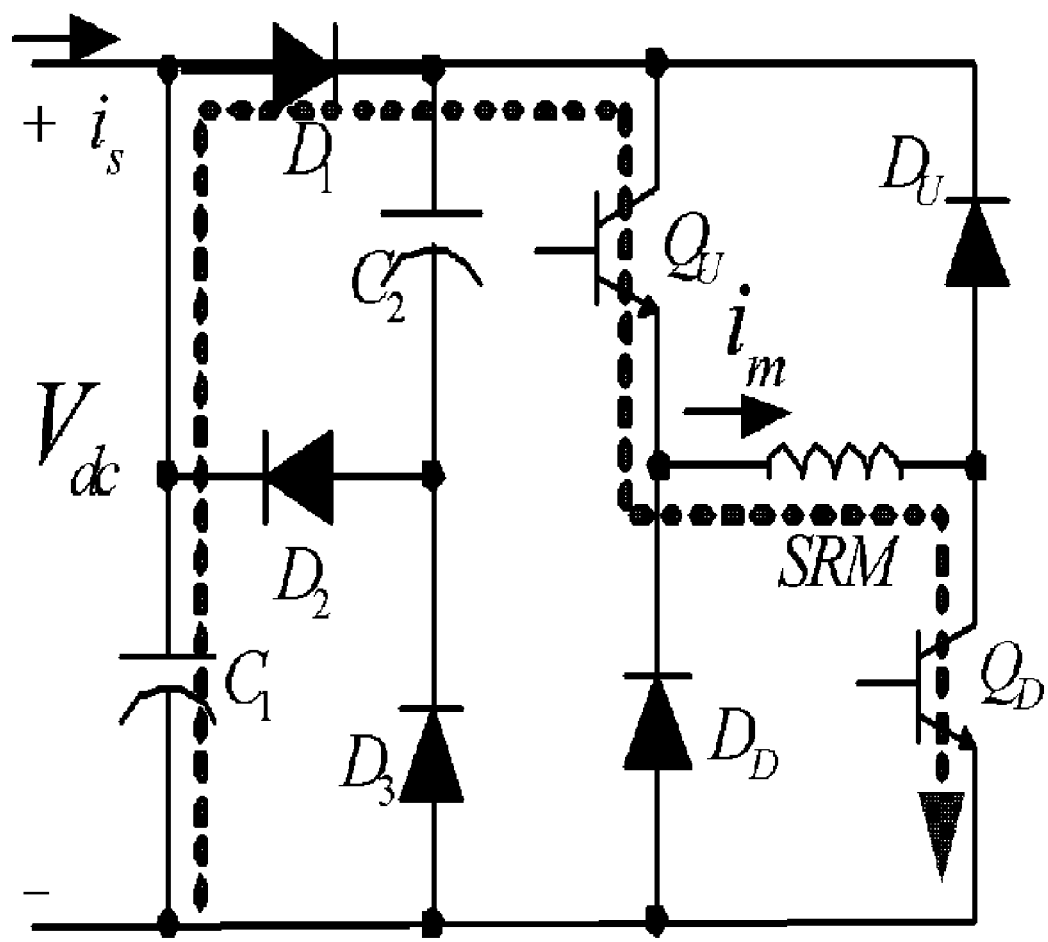
FIGS. 6A to 6E are circuit diagrams showing operation modes of the passive converter.
Figure 6B:
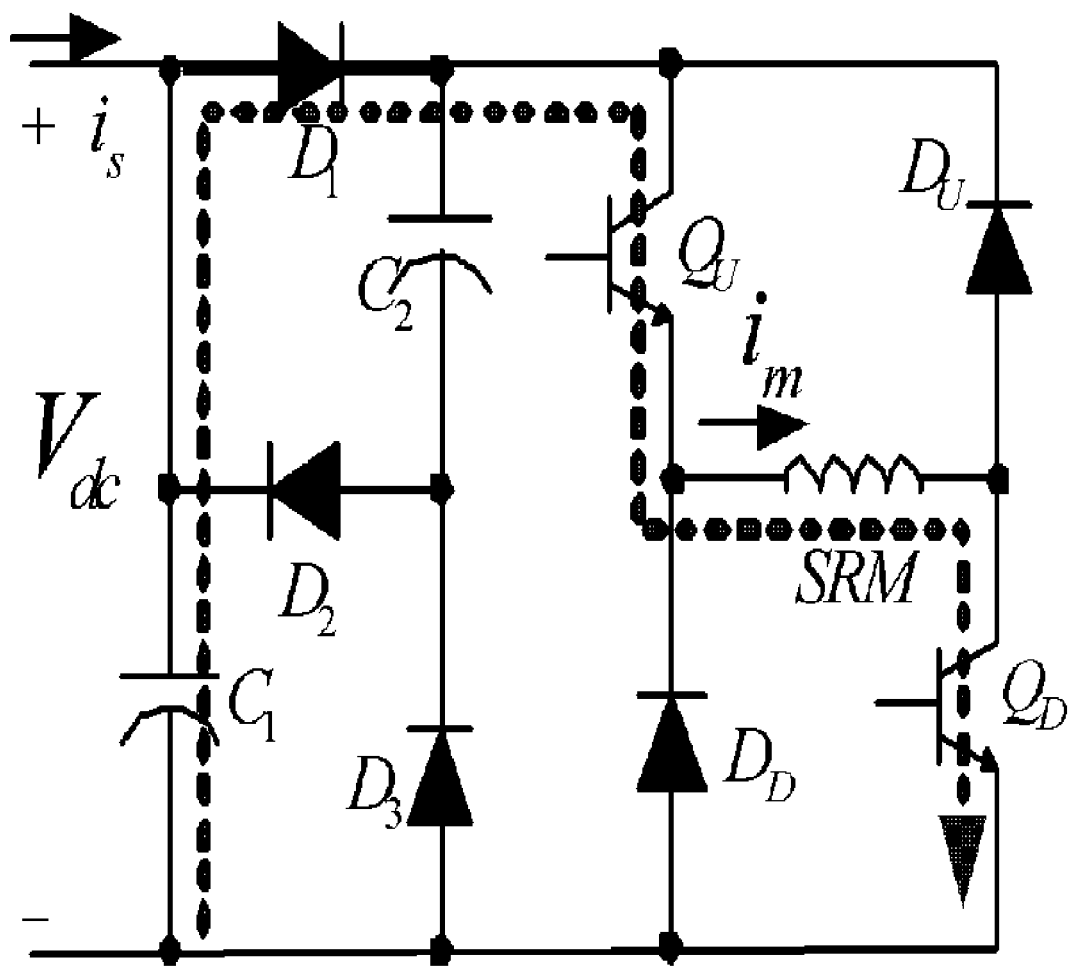
Figure 6C:
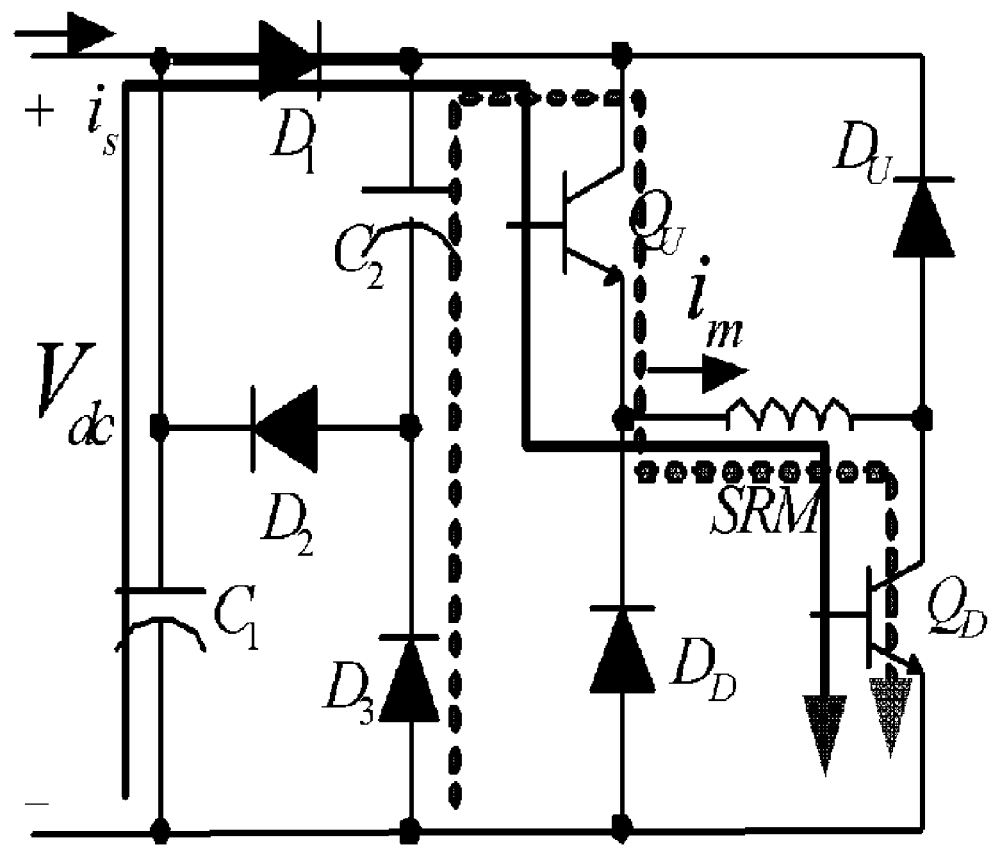
Figure 6D:
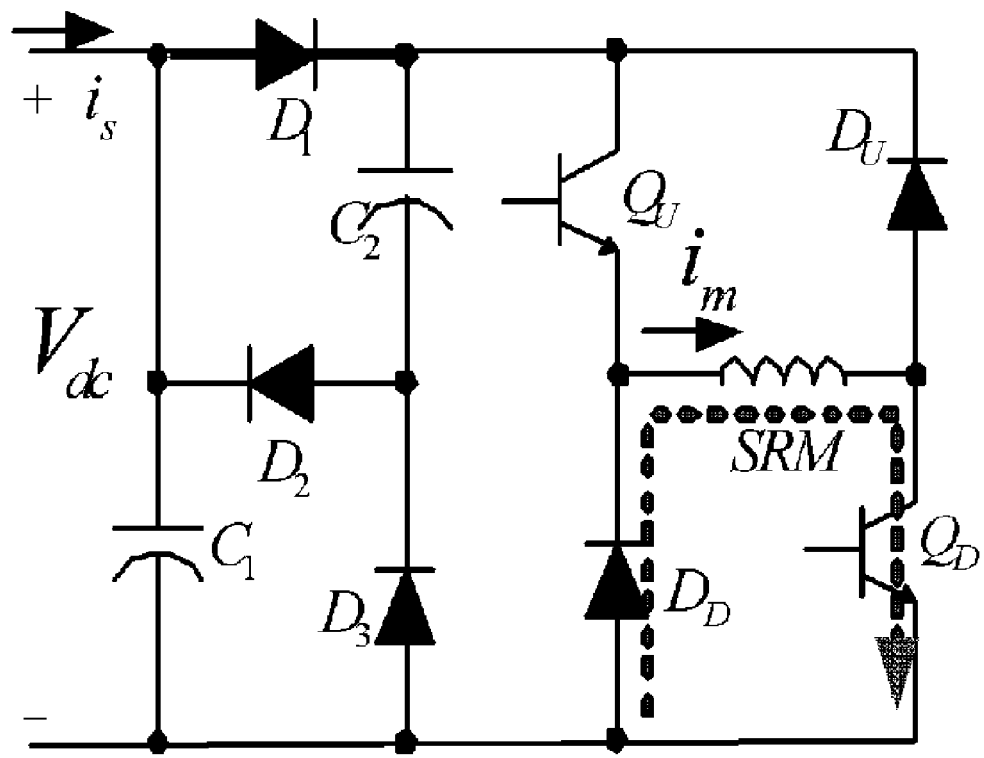
Figure 6E:
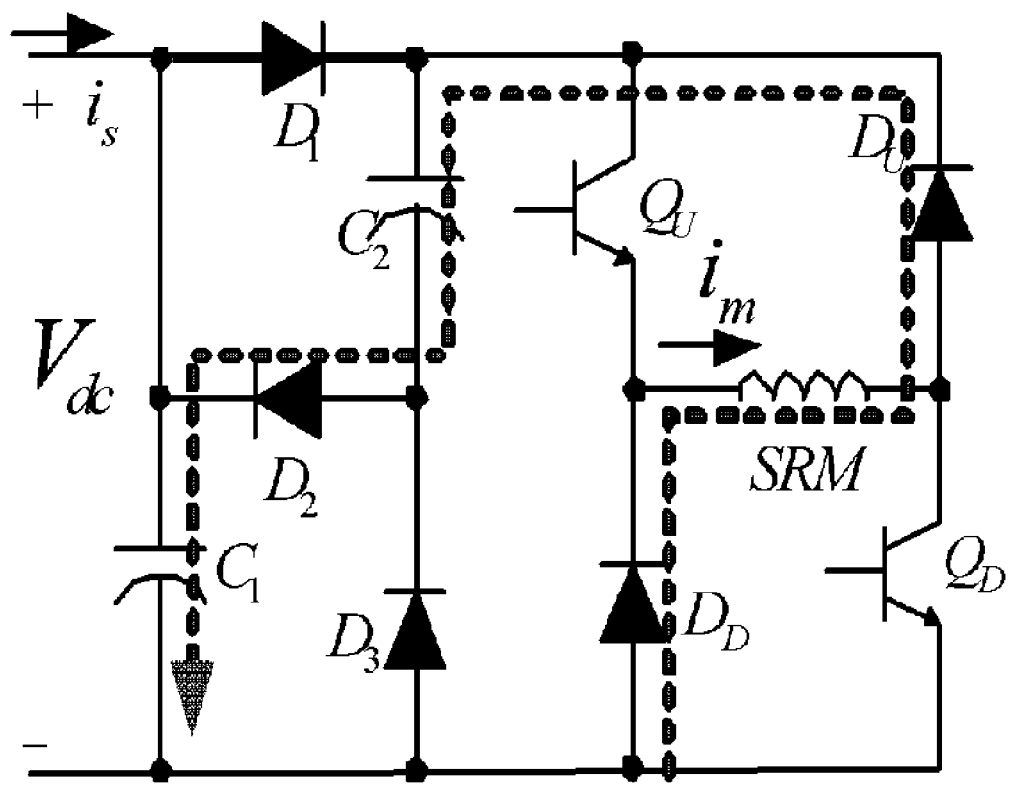

FIGS. 6A to 6E are circuit diagrams showing the five operation modes. FIG. 6A is a circuit diagram showing the boost capacitor excitation mode (excitation mode-1), and FIG. 6B is a circuit diagram showing the DC link capacitor excitation mode (excitation mode-2). FIG. 6C is a circuit diagram showing the two-capacitor excitation mode (excitation mode-3), and FIG. 6D is a circuit diagram showing the freewheeling mode. FIG. 6E is a circuit diagram showing the fast demagnetization mode.

In comparison with the asymmetric converter 40, three excitation modes are formed according to the voltage of a boost capacitor. Voltage states, switch states, and phase voltage are shown in Table 1.

TABLE 1

Operation Modes of Passive Converter according to the present invention

| Mode | Voltage stages | Switch states | Phase voltage |
|---|---|---|---|
| Excitation-1 | $V_{C1} > V_{C2}$ | $(Q_u, Q_d, D_3)$ on $(D_1, D_2, D_U, D_D)$ off | $V_{C2} - V_D - 2V_Q$ |
| Excitation-2 | $V_{C1} < V_{C2}$ | $(Q_u, Q_d, D_1)$ on $(D_2, D_3, D_U, D_D)$ off | $V_{C1} - V_D - 2V_Q$ |
| Excitation-3 | $V_{C1} = V_{C2}$ | $(Q_u, Q_d, D_1, D_3)$ on $(D_2, D_U, D_D)$ off | $V_{C2} - V_D - 2V_Q$ |
| Freewheeling |  | $(Q_d, D_D)$ ON $(Q_u, D_1, D_2, D_3, D_U)$ off | $-(V_D + V_Q)$ |
| Demagnetization |  | $(D_U, D_D, D_2)$ on $(Q_U, Q_d, D_2, D_3)$ off | $-(V_{C1} + V_{C2} + 3V_D)$ |

Figure 7A:
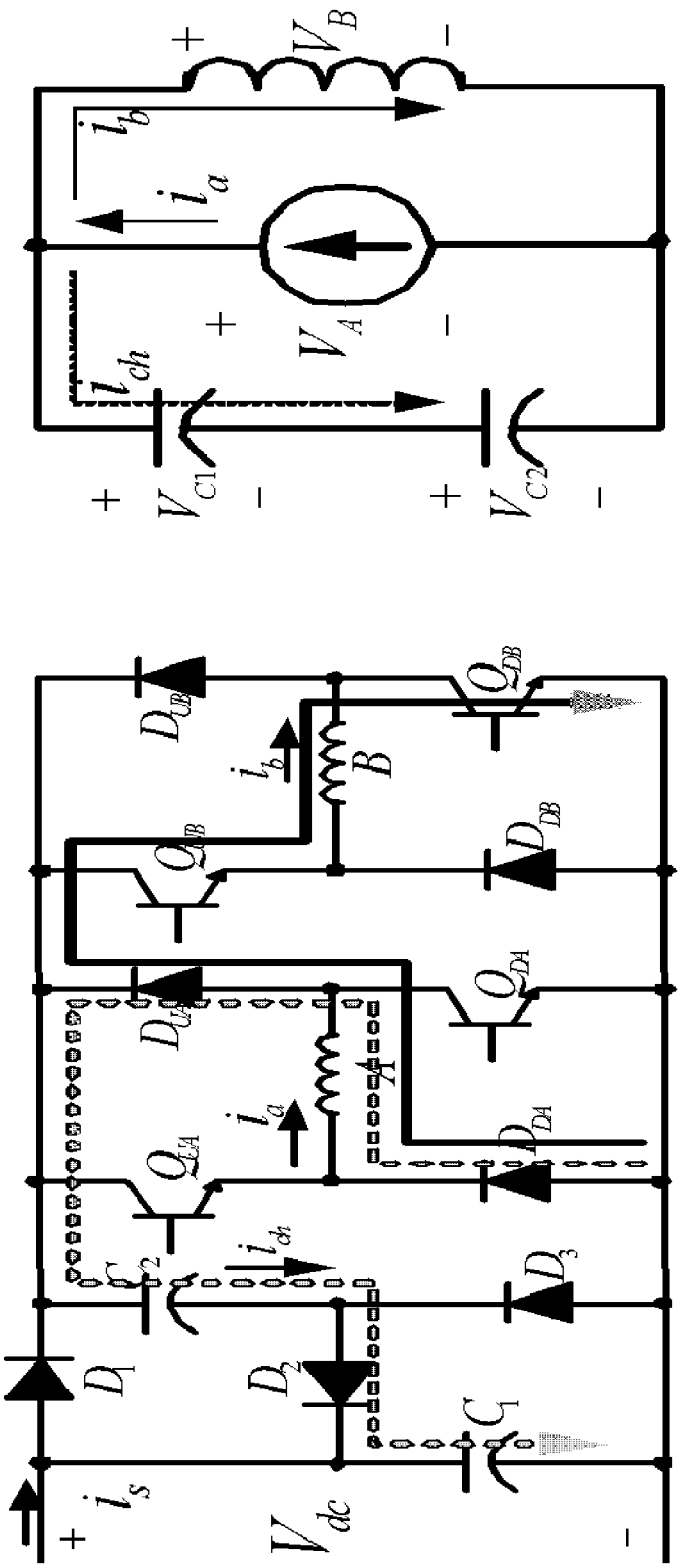
FIGS. 7A and 7B are circuit diagrams showing a current overlap operation mode of the passive converter according to the present invention.
Figure 7B:
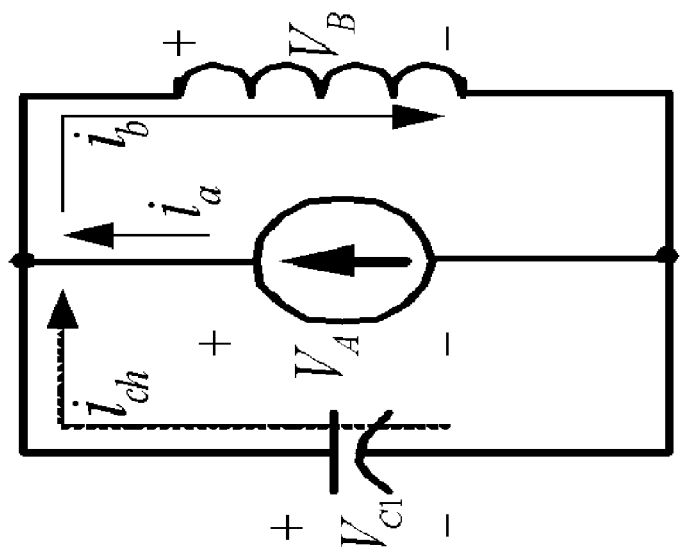
Figure 7B:
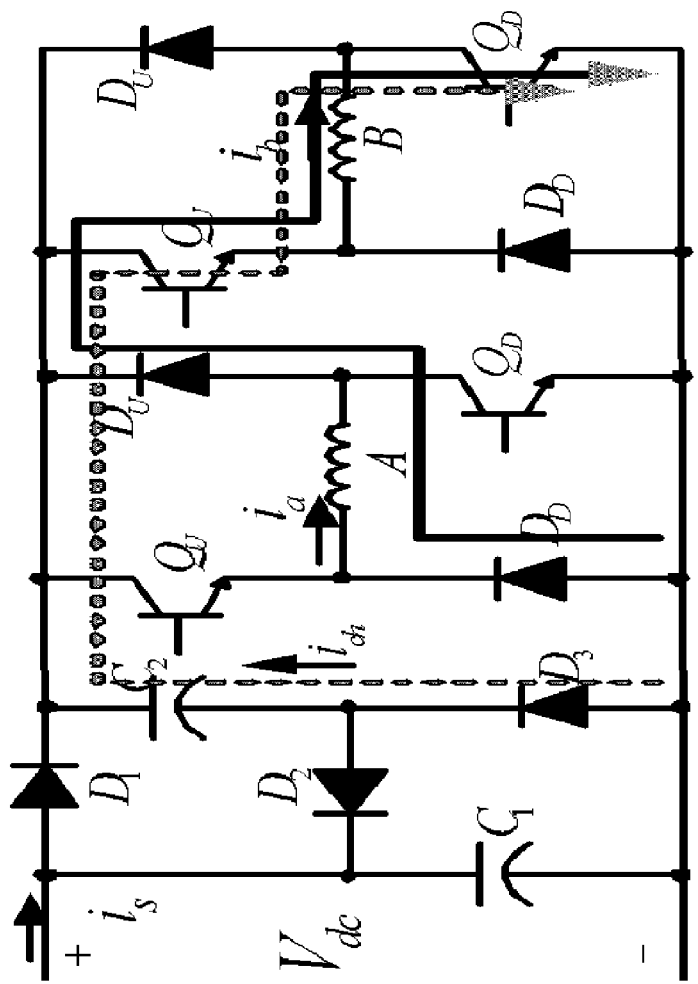

The voltage of the phase winding is determined according to the relationship between previous and present phases. FIGS. 7A and 7B are circuit diagrams showing a current overlap operation mode of the passive converter according to the present invention.

On the assumption that phases A and B represent the previous and present phases, respectively, when $i_a > i_b$, demagnetization current having the previous phase is divided into two sections as shown in FIG. 7A. One section is applied to the present phase to build up as phase current, and the other section is charged to the first and second capacitors $C_1$ and $C_2$ connected to each other in series.

The previous-phase current $i_a$ is expressed through Equation 1

$$i_a = i_b + i_{ch} \qquad \text{Equation 1}$$

When viewed in an equivalent circuit, demagnetization phase current serves as a current source. The duration voltage of the current source is exactly calculated through a connected circuit. Previous-phase voltage and present-phase voltage are expressed as Equations 2 and 3 due to the charge effect of the series-connected first and second capacitors $C_1$ and $C_2$.

$$V_A = -(V_{c1} + V_{c2}) \qquad \text{Equation 2}$$

$$V_B = -V_A = V_{c1} + V_{c2} \qquad \text{Equation 3}$$

Under the condition, high demagnetization voltage is applied to the previous phase, and high excitation voltage is applied to the present phase. Accordingly, fast excitation current and fast demagnetization current can be obtained.

Figure 8:
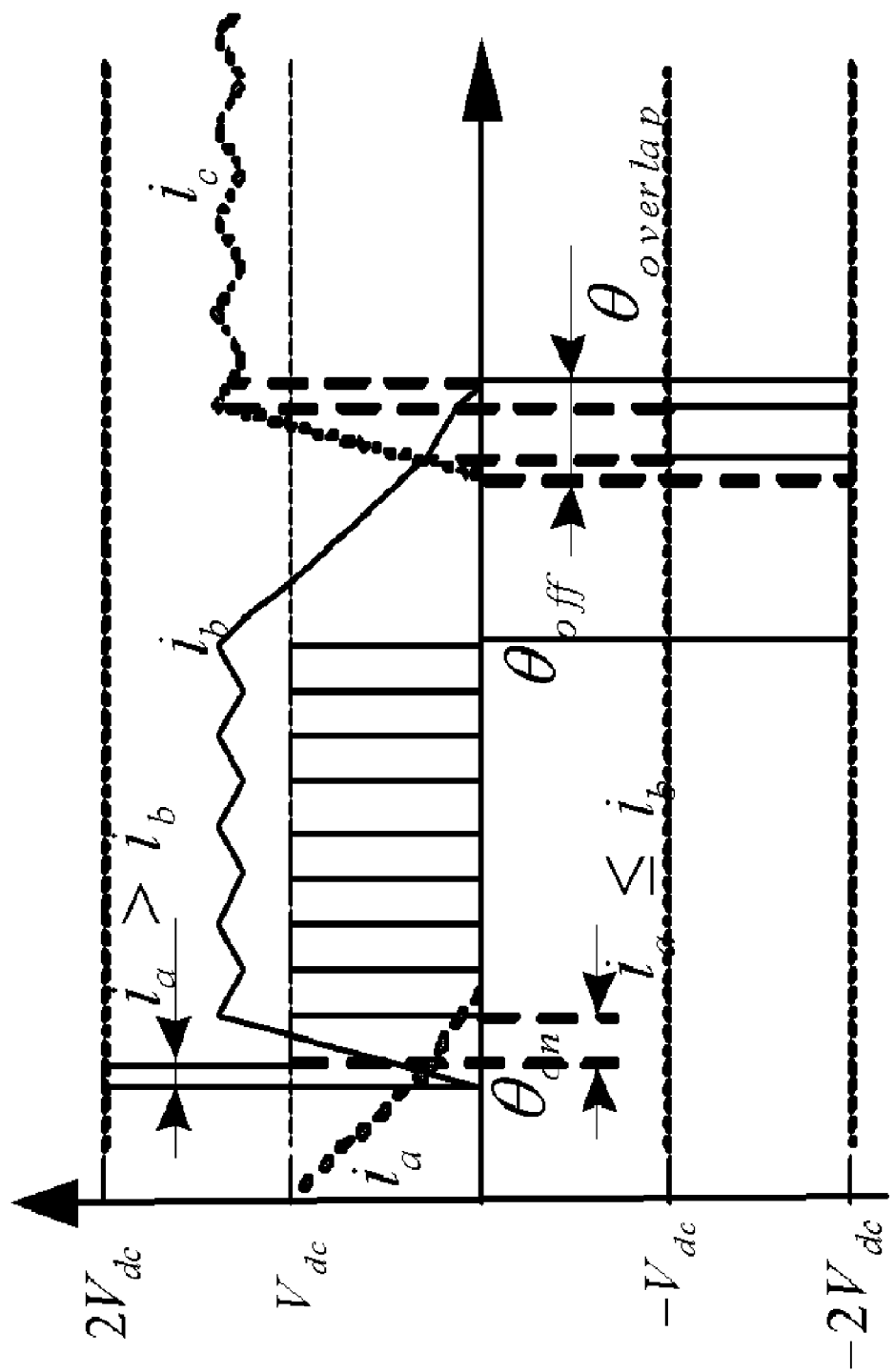
FIG. 8 is a view showing voltage and current waveforms in an overlap operation.

FIG. 8 is a view showing voltage and current waveforms in an overlap operation.

When $i_a < i_b$, as shown in FIG. 7B, demagnetization current having the previous phase is not sufficient to be supplied to the preset phase. In order to satisfy the previous phase, another current is required. Accordingly, all magnetic energy of the previous phase is applied to the present phase.

Based on the passive capacitor circuit according to the present invention, output voltage is same to the voltage of the parallel-connected first and second capacitors $C_1$ and $C_2$. In addition, the voltage of the boost capacitor C1 is higher than the voltage of the DC link capacitor C2 due to energy that has been already charged to the boost capacitor C1. Therefore, the first diode D1 is turned on, so that the voltage of the boost capacitor C1 supplies current at the present phase. The phase current having the present phase is expressed as Equation 4.

$$i_b = i_a + i_{ch} \qquad \text{Equation 4}$$

The phase voltage having the previous or present phase windings is expressed as Equation 5 or 6, respectively.

$$V_A = -V_{C1} \qquad \text{Equation 5}$$

$$V_B = -V_A = V_{C1} \qquad \text{Equation 6}$$

Accordingly, although the passive converter according to the present invention can be driven in the poly-phase SRM, high demagnetization voltage is generated only at current overlap duration. Actually, the current overlap duration is shorter than excitation duration.

Figure 9:
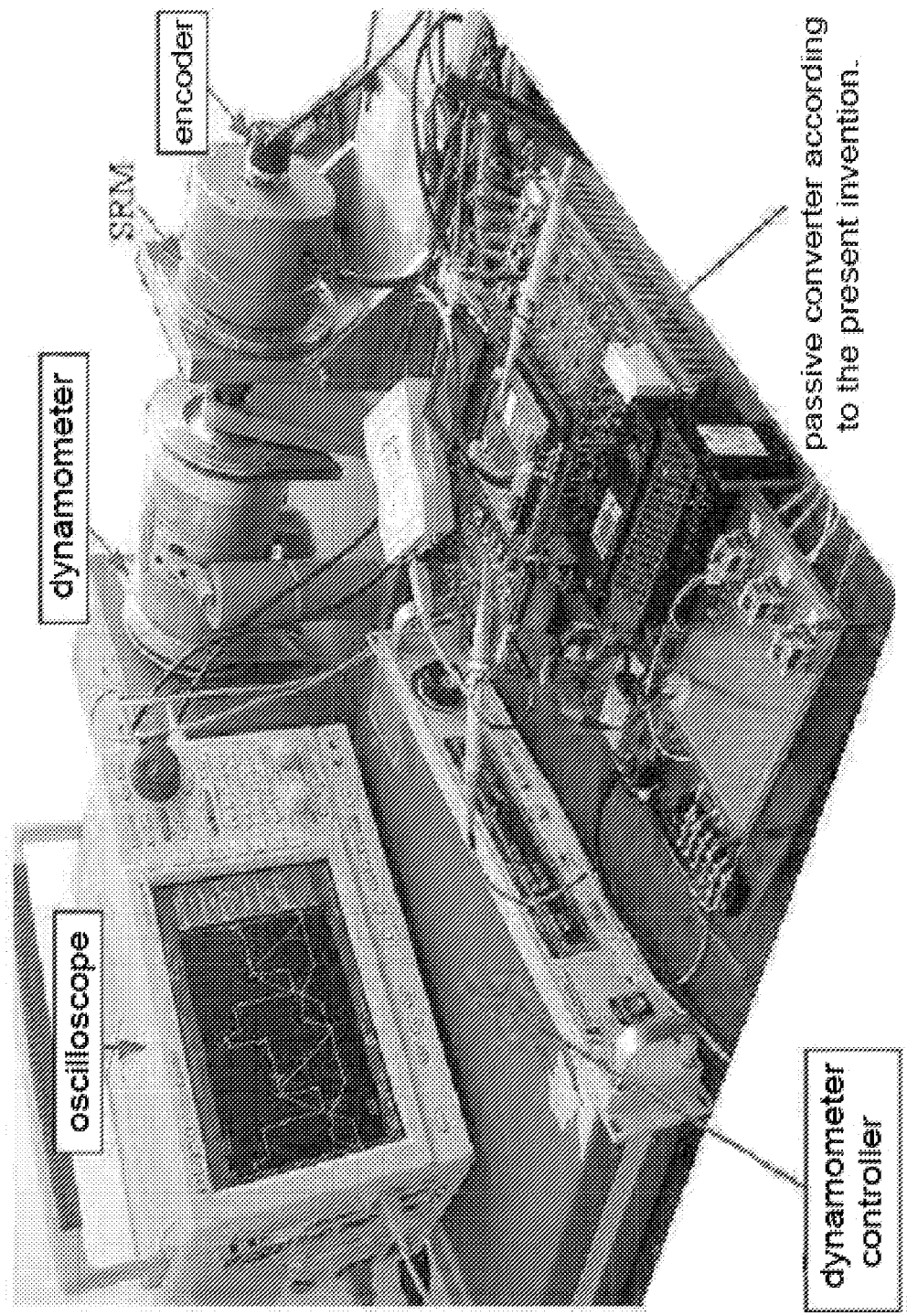
FIG. 9 is a view showing experimental equipment to verify the passive converter of the SRM drive device according to the present invention.

FIG. 9 is a view showing experimental equipment to verify the passive converter of the SRM drive device according to the present invention.

A TMS320F2812 DSP chip is used for a drive controller having a clock frequency of 150 MIPS. As shown in FIG. 9, the experimental equipment includes an oscilloscope, a dynamometer, a dynamometer controller, an SRM, an encoder of detecting the rotational state of the SRM, and the passive converter according to the present invention.

Figure 10:
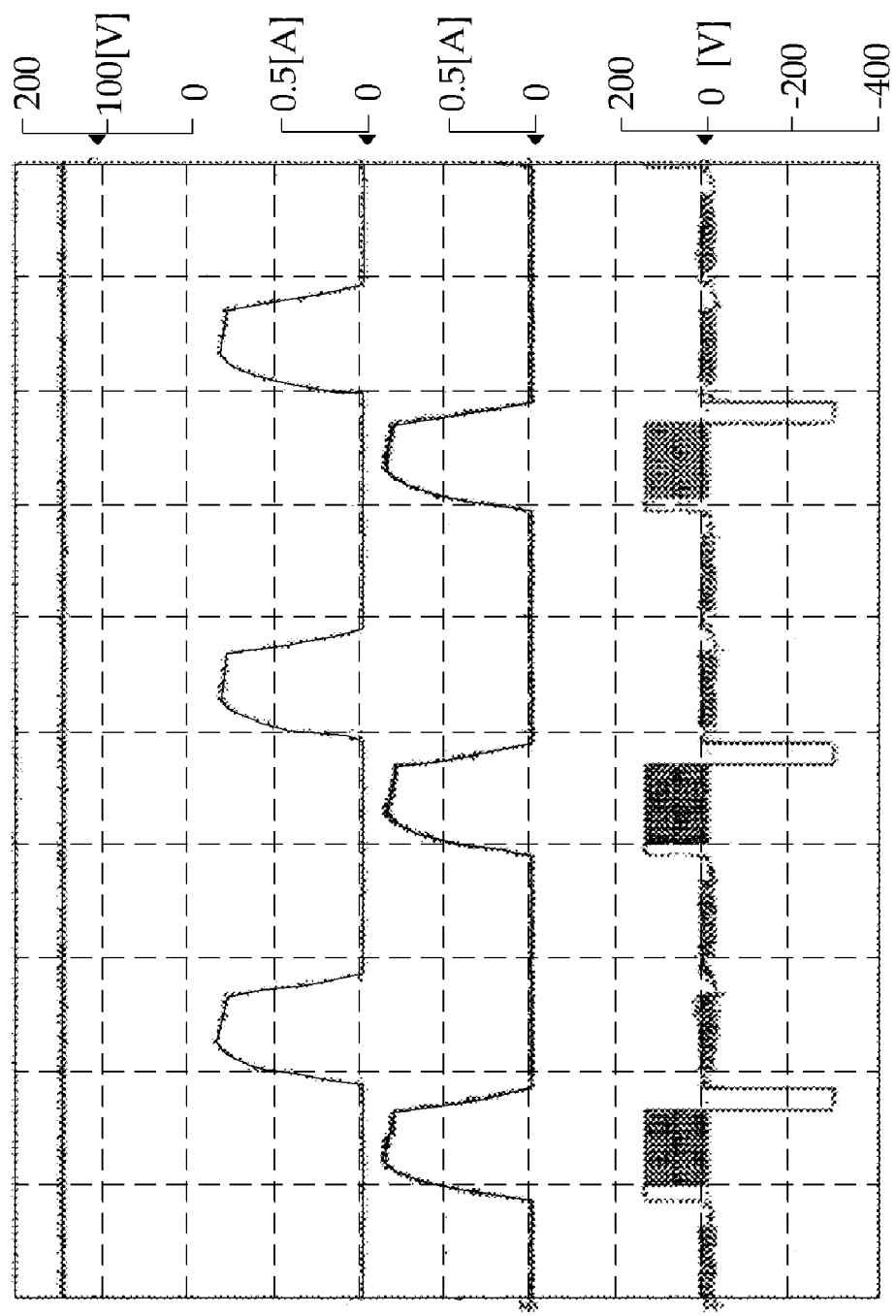
FIG. 10 is a view showing experimental results for PWM control [500 rpm] of the passive converter according to the present invention.

FIG. 10 is a view showing experimental results for PWM control [500 rpm] of the passive converter according to the present invention. As shown in FIG. 10, double DC link demagnetization voltage is applied. In addition, tail current and negative torque are reduced due to high demagnetization voltage of the passive converter according to the present invention. In addition, the voltage of the boost capacitor voltage is maintained at a constant value.

Figure 11:
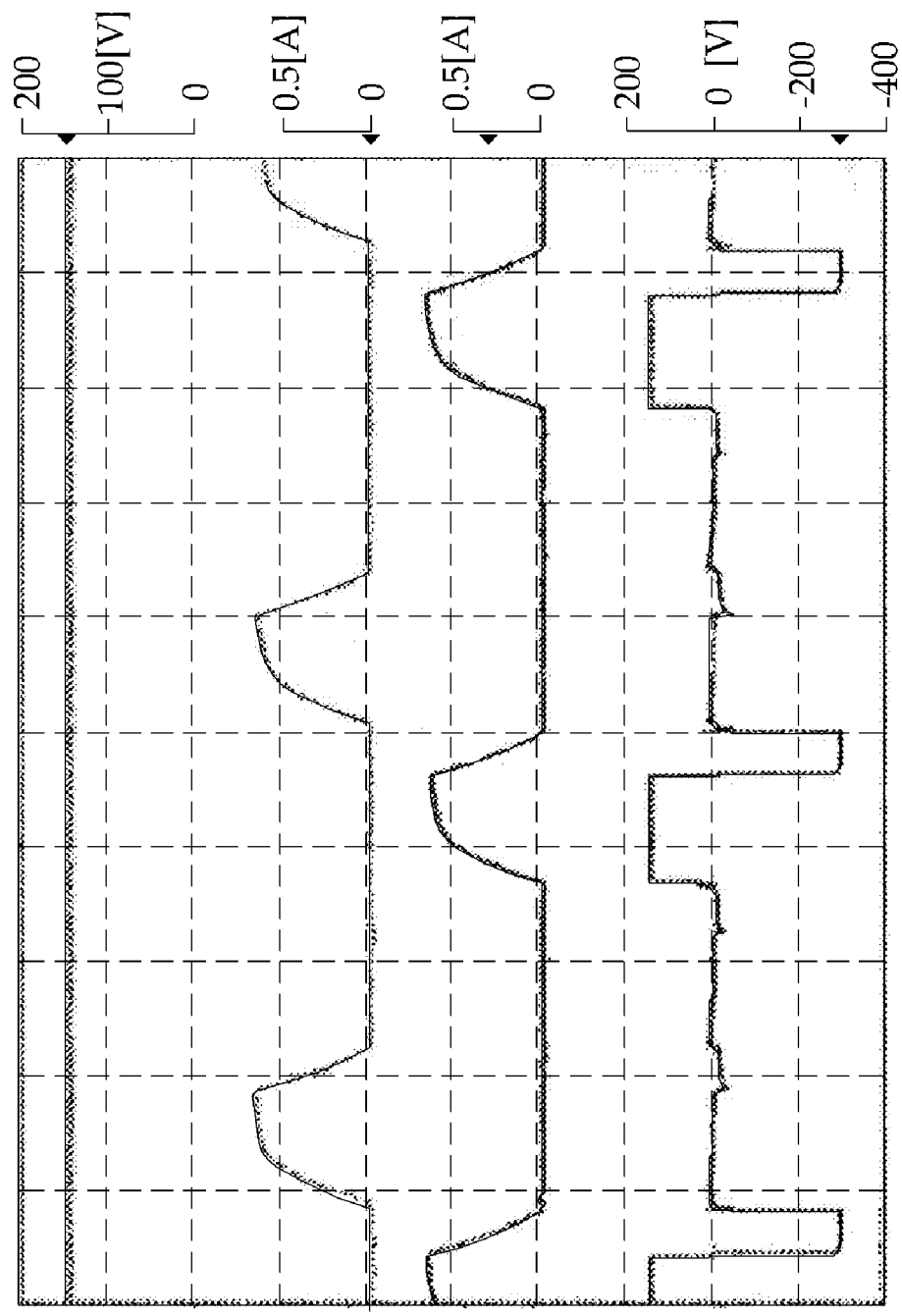
FIG. 11 is a view showing single pulse control [900 rpm] of the passive converter without current overlap according to the present invention.

FIG. 11 is a view showing single pulse control [900 rpm] of the passive converter without current overlap according to the present invention. Based on the single pulse control, full voltage is applied to the phase winding. After a turn-off angle, double DC link demagnetization voltage is applied, and tail current is significantly reduced.

Figure 12:
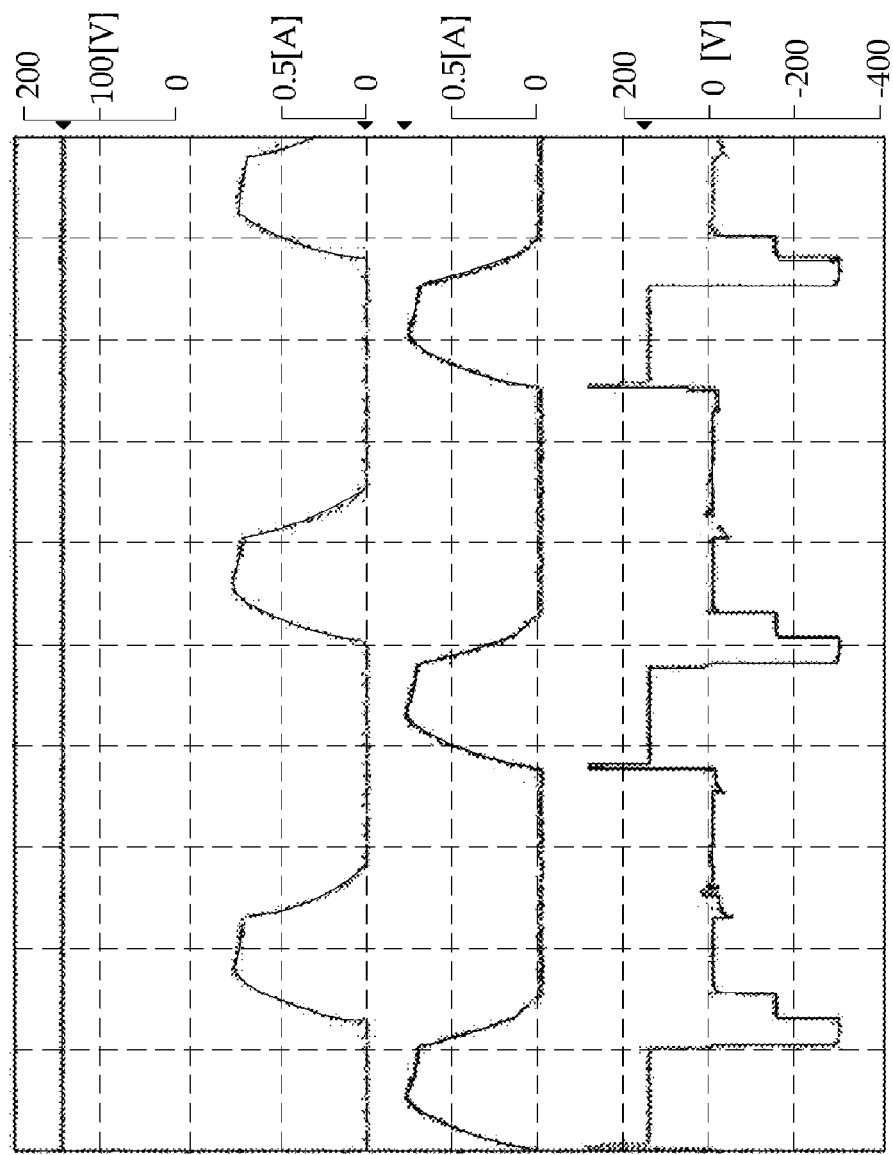
FIG. 12 is a view showing single pulse control [1000 rpm] of the passive converter with the current overlap according to the present invention.

FIG. 12 is a view showing single pulse control [1000 rpm] of the passive converter with the current overlap according to the present invention. Due to the current overlap, double DC link excitation voltage is applied for a short time, and excitation current is rapidly built up. After the turn-off angle, although the phase voltage becomes double DC link voltage, the phase voltage is changed to DC link voltage at the cross section of the phase current.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A passive converter for a drive device of a switched reluctance motor (SRM) for providing high demagnetization voltage for the SRM, comprising:
    a rectifier which smoothes input voltage to supply DC voltage;
    a boost circuit connected with the rectifier, wherein the boost circuit includes a first terminal, a second terminal, a third terminal, and a fourth terminal;
    an asymmetric converter connected with the boost circuit;
    a first capacitor connected between the first terminal and second terminal;
    a second capacitor connected between the third terminal and fourth terminal;
    a first diode connected between the first terminal and third terminal;
    a second diode connected between the first capacitor and second capacitor; and
    a third diode connected between the third terminal and fourth terminal.

2. The passive converter of claim 1, wherein input/output voltage of the first to fourth terminals depends on the first and second capacitors.

3. The passive converter of claim 1, wherein the first and second capacitors include a passive capacitor.

4. The passive converter of claim 1, wherein the second diode is turned off when the asymmetric converter operates at an excitation mode,
    wherein the second diode is turned on when the asymmetric converter operates at a demagnetization mode, and
    wherein DC link voltage is applied to a phase winding of the switched reluctance motor at the excitation mode, and double DC link voltage is applied to the phase winding at the demagnetization mode.

\* \* \* \* \*